(12) United States Patent
Cook et al.

(10) Patent No.: US 7,397,162 B2
(45) Date of Patent: Jul. 8, 2008

(54) METHOD AND APPARATUS FOR CHECKING STATOR CORE ALIGNMENT

(75) Inventors: James Allan Cook, Orlando, FL (US); Thomas M. Majernik, Pittsburgh, PA (US)

(73) Assignee: Siemens Power Generation, Inc., Orlando, FL (US)

( * ) Notice: Subject to any disclaimer, the term of this patent is extended or adjusted under 35 U.S.C. 154(b) by 371 days.

(21) Appl. No.: 11/285,833

(22) Filed: Nov. 22, 2005

(65) Prior Publication Data

US 2007/0114873 A1    May 24, 2007

(51) Int. Cl.
*H02K 1/06*    (2006.01)

(52) U.S. Cl. .................................... 310/217; 310/259
(58) Field of Classification Search ......... 310/216–218, 310/254, 259
See application file for complete search history.

(56) References Cited

U.S. PATENT DOCUMENTS 5,875,540 A    3/1999    Sargeant et al.

*Primary Examiner*—Thanh Lam

(57) ABSTRACT

In one embodiment the present invention provides for a method for checking the alignment of a stator core that comprises placing a laser source 14 and a target 18 a given distance apart on a stator core 10 and activating the laser such that the laser strikes the target. Then measuring on the target where the laser strikes, and interpreting the measurement to determine any misalignment of the stator core in the given distance.

13 Claims, 2 Drawing Sheets

METHOD AND APPARATUS FOR CHECKING STATOR CORE ALIGNMENT

FIELD OF THE INVENTION

The field of the invention relates to stator cores, and more particularly to the proper alignment of stator cores.

BACKGROUND

The generator stator core is the largest component in the train of a turbine generator set. The stator cores are generally manufactured from thousands of laminations of relatively thin steel plates which are stacked, pressed and clamped together into the large cylindrical form of the stator core. Typically, the stator core is assembled from the steel plates directly at the final installation site. However, the large size of the stator core and the need for proper clamping results in stator core manufacturing difficulties, including generous floor space and high crane requirements. U.S. Pat. No. 5,875,540 by Sargeant, which is incorporated herein by reference, overcame some of the problems with the prior art by first assembling a number of laminations into a distinct set, referred to as a donut, and then stacking these donuts to form a stator core. This saved great amounts of time over assembling the laminations individually, and produced a stator core with less flaws. When the individual laminations, or the set of laminations in a donut, are installed into a core, they engage what are referred to as keybars. Keybars are essentially rods that run the internal length of the stator core and provide a hook-in spot for the laminations. Laminations are inserted within the stator frame, engaging keybars and are stacked together to form the stator core. An end-on view is shown in FIG. 1 of a stator core 10. Since it is assembled, the laminations that make up the core are not separately discernable from this perspective. The core is held to its frame (not shown) by keybars 6, but the core itself is held together by thru-bolts 12, which are literally long metal bolts that extend through the length of the core, keeping all of the laminations together.

One advantage of using donuts is that the core can be stacked horizontally, rather than vertically as is the common practice. Stacking the core horizontally saves large amounts of time and effort. When the cores were being stacked vertically, a center post was placed down the middle of the assembling core and variation was measured against this reference. When the core is stacked horizontally, however, the use of a center post becomes problematic. Therefore, although stacking the core horizontally can largely be a better practice than vertical stacking, there remain some difficulties in the practice.

What is needed is a method and apparatus that allows for an improvement in checking stator core alignment. Particularly what is needed is an improvement in checking stator core alignment for a core that is being assembled horizontally.

Other difficulties with the prior art also exist, some of which will be apparent upon further reading.

SUMMARY OF THE INVENTION

With the foregoing in mind, methods and apparatuses consistent with the present invention, which inter alia facilitates the check of stator core alignment, either in a existing core, or one that is being assembled. The invention provides a laser source aligned with a target a distance away along the core. In some cases the slot of the core itself provides a means of alignment. The degree to which the laser strikes the target off-center indicates the amount of misalignment. Multiple laser can find patterns of misalignment that are not readily apparent from single measurements.

These and other objects, features, and advantages in accordance with the present invention are provided particular embodiments by a method for checking the alignment of a stator core that comprises placing a laser source and a target a given distance apart on a stator core and activating the laser such that the laser strikes the target. Then measuring on the target where the laser strikes, and interpreting the measurement to determine any misalignment of the stator core in the given distance.

In related embodiments the laser source and the target are placed a given distance apart in a slot of the stator core. The method may be performed in multiple slots along the inner perimeter of the stator core to give multiple measurements which are then interpreted to determine any misalignment.

In another embodiment the present invention provides for a method for checking the alignment of laminations being assembled into a stator core, that comprises placing a laser in a slot in a first series of laminations, placing a target in a matching slot in a second series of laminations, and projecting the laser to the target. Then measuring where on the target the laser projection strikes and interpreting the measurement for misalignment of the second series of laminations. Then also correcting any misalignment by at least one of, re-aligning the second series of laminations and adjusting the next series of laminations to compensate for any misalignment.

In one embodiment the stator core is complete, but in other embodiments, the second series of laminations is a donut being added to an assembling stator core. The laser and the target may be held into the slots of the stator core by at least one of wedges, blocks, magnetics and friction. The target may also have gradients that can indicate a range of misalignment.

In still another embodiment the present invention provides for an apparatus for checking the alignment of a stator core that comprises a stator core, a laser source, and a target. The laser source and the target are aligned a distance apart along an axis of the stator core within an inner diameter of the stator core. The point at which the laser source strikes the target indicates a measurement of misalignment of the stator core. In a related embodiment multiple laser sources and the targets are used.

Other embodiments of the present invention also exist, which will be apparent upon further reading of the detailed description.

BRIEF DESCRIPTION OF THE FIGS.

The invention is explained in more detail by way of example with reference to the following drawings.

DETAILED DESCRIPTION OF THE INVENTION

Figure 1:
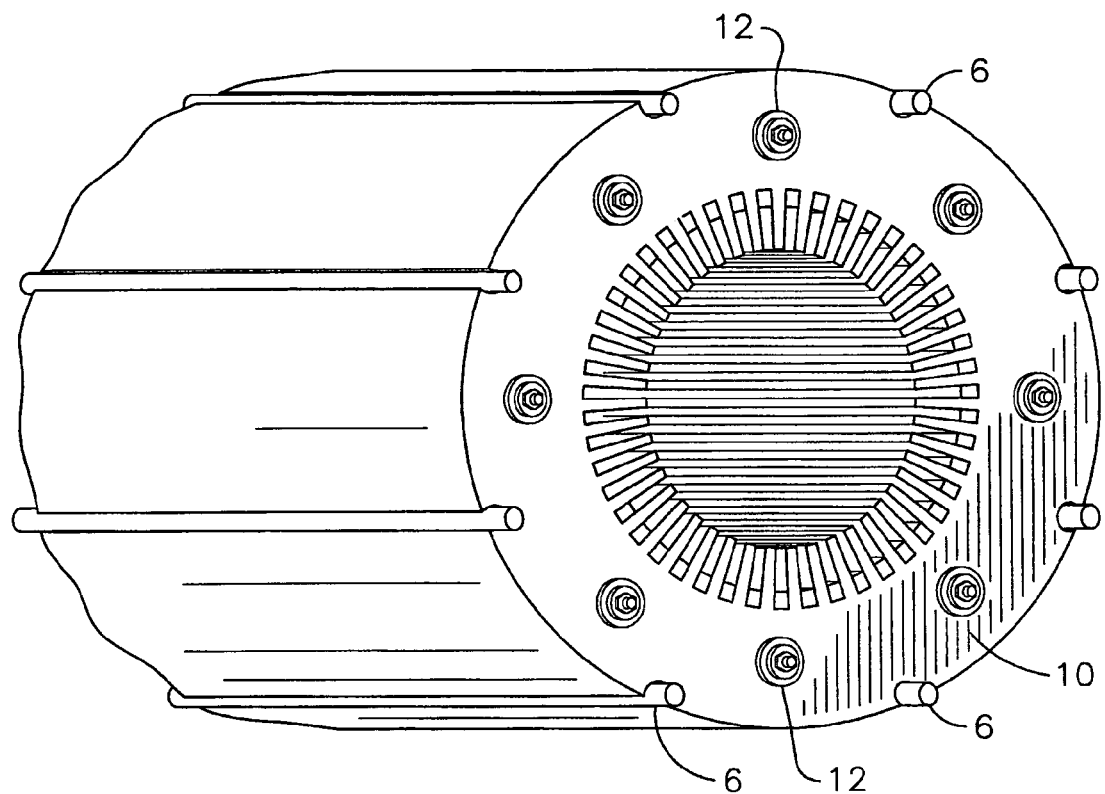
FIG. 1 illustrates a core attached to keybars as per the prior art.

The present invention provides for a method and apparatus for checking stator core alignment. Stator cores are large units that are assembled from many thin steel laminations. Sometimes the laminations are pre-assembled into groups, referred to as donuts, and the donuts are then stacked together. Proper alignment of the stator core is critical for efficient operation of a generator; however, it is exceedingly difficult to align the core while it is being assembled, particularly if the core is being assembled horizontally.

By using an in-slot laser and target, the present invention allows for a more accurate measurement of the alignment of a stator core. The in-slot laser is positioned inside of the slots of the stator core. In assembled cores it can be placed anywhere along the core, but obtains maximum benefit by being placed at an end. For cores that are being assembled, it is placed in the initial laminations or donut.

The target is then placed a distance away from the in-slot laser. The target may be placed on the very next donut segment to check its alignment individually, which is particularly useful when a core is being assembled, or it may be placed at the opposite end of the core to check alignment down the entire length.

The target may be of a variety of configurations. For example, a typical flat, bulls-eye type target may be used. A variation on this would be an inverted cone. Depending on where the laser hits the target, the amount of misalignment can be measured, as will be discussed below. The target may also contain gradients, such as concentric circles, that have been calibrated to indicate the amount of misalignment. For example, the gradient closest to the center of the target may indicate that the misalignment is a fraction of centimeter and can be ignored, while a gradient closer to the perimeter indicates that the misalignment is severe and provides an estimated range of misalignment. Exact measurements from the gradients will have to be specific to the type of stator core that the target is being used with, and the target will need to be spaced a consistent distance from the laser.

Both the laser and the target need to sit in precise positions within the slots. The laser needs to shoot its beam parallel to the axis of the laminations in which it sits, and the target needs to be aligned within the slot such that it accurately reflects the positioning of the laminations in which it sits. The illumination that the laser projects may be round or linear, depending on the application.

The amount that the laser is off the center of the target is a measurement of the misalignment. The laminations can then be adjusted so that the laser hits the target's center, or successively placed laminations may be offset to correct for the earlier misalignment. Although a single measurement can give a misalignment measurement, taking multiple measurements from multiple slots around the inner circumference of the stator core will provide greater accuracy. In addition, small nuances, such as whether the stator core needs to be shifted or rotated will be more evident with more measurements. This may be done with a single laser and target used multiple times, or simultaneously in multiple slots.

Figure 2:
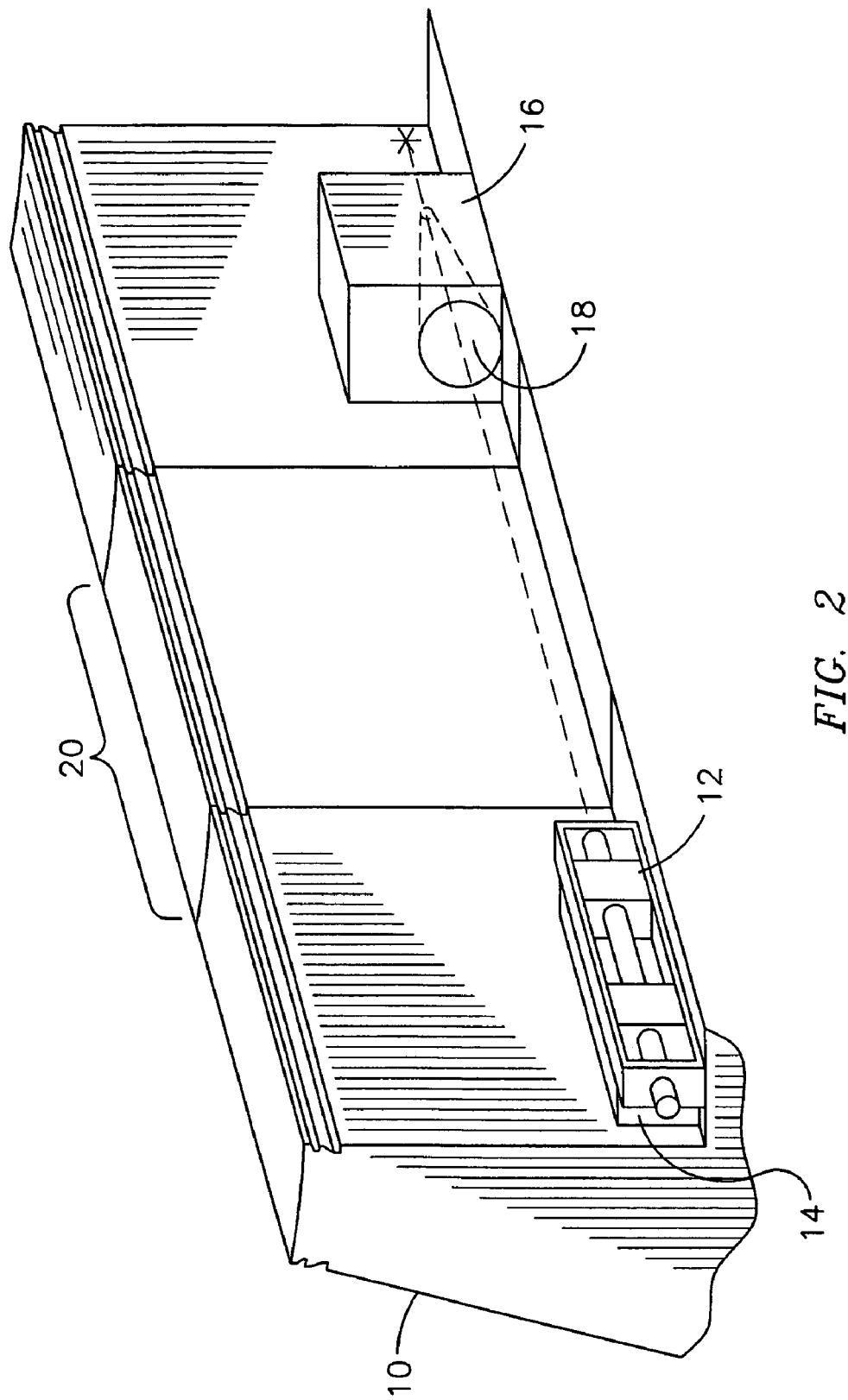
FIG. 2 illustrates a laser and a target being used in a stator core slot as per one embodiment of the present invention.

Referring to FIG. 2, a section of the stator core 10 is illustrated. In this embodiment a laser 12 resting in a particular slot is aimed at an inverted-cone type target 16, striking the target off of center 18. In this figure, the target and the laser are two donut segments 20 apart. It is necessary that the laser and target be designed to matching dimensions, so that any-off center striking of the target is attributable only to misalignment of the core. The laser and target may be held into position by a variety of techniques, such as by a wedge or block 14, or by their having magnetized bases. In the embodiment illustrated in FIG. 2, the laser and target sit in a slot within the assembling core. This arrangement may also be used in other places, such as on the space between the slots.

Figure 3:
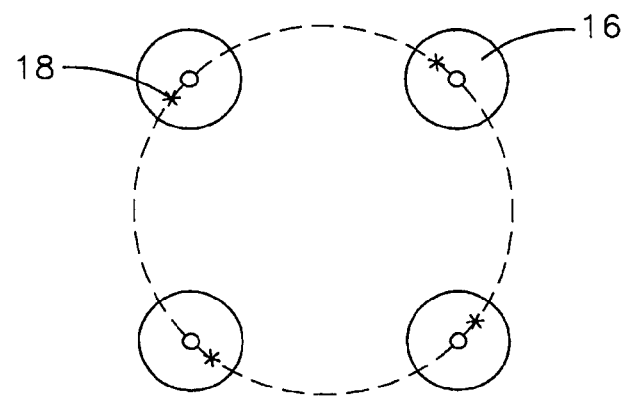
FIG. 3 illustrates a examples of four targets measuring a counter-clockwise shift as per one embodiment of the present invention.

FIG. 3 shows an illustrative example of four targets 16 reading a counter-clockwise misalignment of a core segment. The laser strikes the individual targets in different positions 18, such that the rotation of the core segment is evident. Had only one of the four measurements been taken, it would have been more difficult to distinguish the rotations versus a linear shift.

In one embodiment the present invention provides for a method for checking the alignment of a stator core that comprises placing a laser source and a target a given distance apart on a stator core and activating the laser such that the laser strikes the target. Then measuring on the target where the laser strikes, and interpreting the measurement to determine any misalignment of the stator core in the given distance.

In related embodiments the laser source and the target are placed a given distance apart in a slot of the stator core. The method may be performed in multiple slots along the inner perimeter of the stator core to give multiple measurements which are then interpreted to determine any misalignment.

In some embodiments the laser projects a slit, and the target is an inverted cone. The target may further comprise gradients that estimate the amount of misalignment.

In another embodiment the present invention provides for a method for checking the alignment of laminations being assembled into a stator core, that comprises placing a laser in a slot in a first series of laminations, placing a target in a matching slot in a second series of laminations, and projecting the laser to the target. Then measuring where on the target the laser projection strikes and interpreting the measurement for misalignment of the second series of laminations. Then also correcting any misalignment by at least one of, re-aligning the second series of laminations and adjusting the next series of laminations to compensate for any misalignment.

In a related embodiment the laser is placed in multiple slots in the first series of laminations and the method is repeated for multiple measurements. In another embodiment multiple lasers are placed in multiple slots and projected onto multiple targets in matching slots to obtain multiple measurements.

In one embodiment the stator core is complete, but in other embodiments, the second series of laminations is a donut being added to an assembling stator core. The laser and the target may be held into the slots of the stator core by at least one of wedges, blocks, magnetics and friction. The target may also have gradients that can indicate a range of misalignment.

In still another embodiment the present invention provides for an apparatus for checking the alignment of a stator core that comprises a stator core, a laser source, and a target. The laser source and the target are aligned a distance apart along an axis of the stator core within an inner diameter of the stator core. The point at which the laser source strikes the target indicates a measurement of misalignment of the stator core. In a related embodiment multiple laser sources and the targets are used.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A method for checking the alignment of a stator core comprising:

placing a laser source and a target a given distance apart on a stator core;

activating said laser such that said laser strikes said target;

measuring on said target where said laser strikes; and interpreting the measurement to determine any misalignment of said stator core in said given distance.

2. The method of claim 1, wherein said laser source and said target are placed a given distance apart in a slot of said stator core.

3. The method of claim 1, wherein said method is performed in multiple slots along the inner perimeter of said stator core to give multiple measurements which are then interpreted to determine any misalignment.

4. The method of claim 1, wherein said laser projects a slit.

5. The method of claim 1, wherein said target is an inverted cone.

6. The method of claim 5, wherein said target further comprises gradients that estimate the amount of misalignment.

7. A method for checking the alignment of laminations being assembled into a stator core, comprising:
   placing a laser in a slot in a first series of laminations;
   placing a target in a matching slot in a second series of laminations;
   projecting said laser to said target;
   measuring where on said target said laser projection strikes;
   interpreting said measurement for misalignment of said second series of laminations; and
   correcting any misalignment by at least one of, re-aligning the second series of laminations and adjusting the next series of laminations to compensate for any misalignment.

8. The method of claim 7, wherein said laser is placed in multiple slots in said first series of laminations and the method is repeated for multiple measurements.

9. The method of claim 7, wherein multiple lasers are placed in multiple slots and projected onto multiple targets in matching slots to obtain multiple measurements.

10. The method of claim 7, wherein said second series of laminations is a donut being added to an assembling stator core.

11. The method of claim 7, wherein said laser and said target are held into the slots of said stator core by at least one of wedges, blocks, magnetics and friction.

12. The method of claim 7, wherein said target further comprises gradients.

13. The method of claim 12, wherein said gradients indicate a range of misalignment.

* * * * *